United States Patent [19]

Bub

[11] 4,052,922
[45] Oct. 11, 1977

[54] HYDRAULICALLY-ACTUATED CABLE CUTTER

[75] Inventor: Robert A. Bub, Gibsonia, Pa.

[73] Assignee: Mine Safety Appliances Company, Pittsburgh, Pa.

[21] Appl. No.: 746,399

[22] Filed: Dec. 1, 1976

[51] Int. Cl.² .................................. B26D 5/12
[52] U.S. Cl. ........................ 83/639; 83/390; 83/926 B
[58] Field of Search .......... 83/926 B, 694, 639, 83/198, 390

[56] References Cited

U.S. PATENT DOCUMENTS

| 3,739,673 | 6/1973 | Temple | 83/639 |
| 3,760,674 | 9/1973 | Temple et al. | 83/639 X |

Primary Examiner—Willie G. Abercrombie
Attorney, Agent, or Firm—Brown, Murray, Flick & Peckham

[57] ABSTRACT

A cable cutting member is adapted to be driven forward in a cable holder to cut a cable therein. For driving the cutting member, an explosive charge is detonated by a spring pressed firing pin slidably mounted in the holder behind the charge. A firing pin retractor slidably mounted in the cable holder behind the firing pin is detachably connected with the pin for retracting it a predetermined distance to compress the firing pin spring, the connection being such that when the pin has been retracted a given distance, it will be released automatically. A considerable distance behind the retractor there is a cylinder having a front end and a closed rear end and containing a piston spaced from both ends and mechanically connected with the firing pin retractor. The cylinder has an opening for water between its front end and the piston so that an increase in water pressure in the cylinder will move the piston rearwardly therein to pull the retractor far enough to release the firing pin.

10 Claims, 4 Drawing Figures

HYDRAULICALLY-ACTUATED CABLE CUTTER

U.S. Pat. No. 3,739,673 discloses a cable cutter that is actuated by a shock wave generated by an underwater explosion. The shock wave closes an electrical contact to fire a cartridge that drives a cutting member through a cable. Although the patented cable cutter operates satisfactorily most of the time, the extremely rough treatment to which such a cutter is subjected in use sometimes interferes with proper operation of the electrical equipment.

It is among the objects of this invention to provide a cable cutter which is actuated by water pressure or the shock wave caused by an underwater explosion, which does not include an electric circuit, and which is more reliable than a cable cutter actuated by an underwater electric switch.

The invention is illustrated in the accompanying drawings, in which

Figure 2:
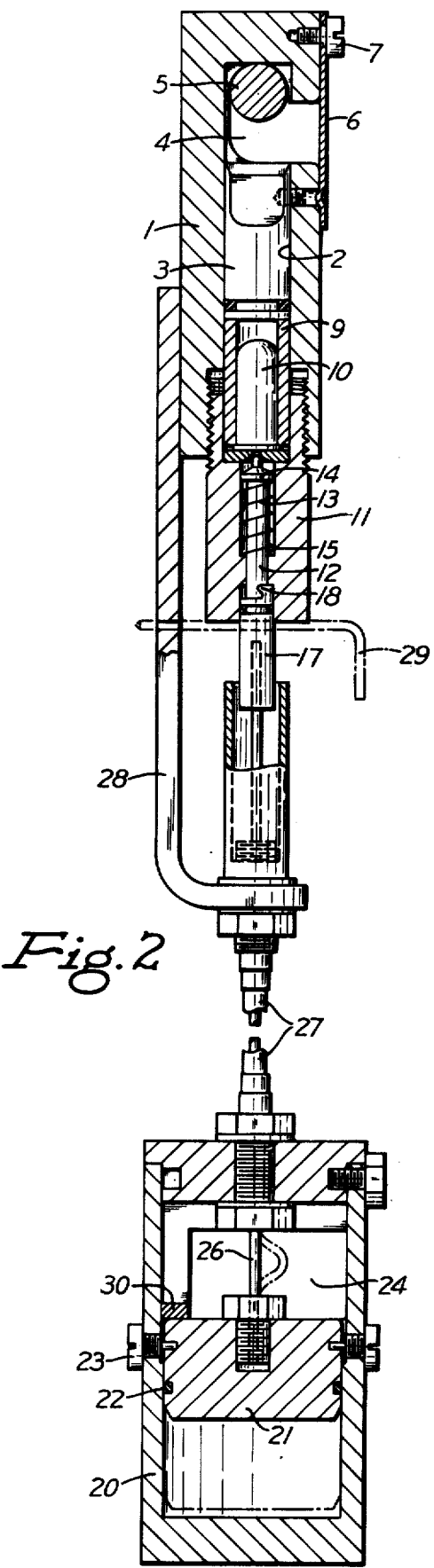
FIG. 2 is a view mostly in vertical section taken on the line II—II of FIG. 1.
Figure 1:
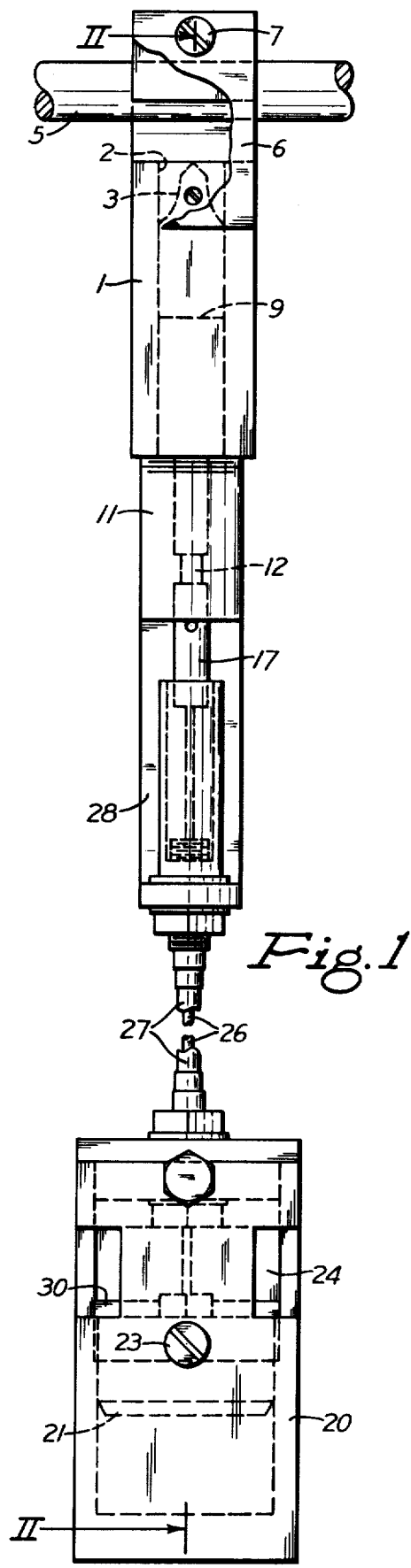
FIG. 1 is a front view of the cutter hanging from a cable to be cut by it.

Referring to FIGS. 1 and 2 of the drawings, a cable cutter includes a cable holder formed from a frame 1 provided with a barrel 2 in which a cutting member or chisel 3 is slidably mounted. The front or upper end portion of the frame has a recess 4 in one side for receiving a cable 5 above the chisel. The cable can be retained in the recess by a metal channel 6 straddling the frame and secured at one end to the frame by means of a pin 7.

Disposed in the barrel behind, i.e. below, the chisel is a sleeve 9 that receives an explosive cartridge 10. The sleeve is held in position by a firing unit body 11 threaded into the lower end of the frame. This body is provided with an axial passage through it, in which a firing pin 12 is slidably mounted behind the cartridge. The firing pin is urged forward by an encircling coil spring 13 compressed between a shoulder 14 on the pin and a shoulder 15 in the passage.

Slidably mounted in the lower end of the passage for the firing pin is the upper end of a firing pin retractor 17. It is connected to the firing pin in such a way that if the retractor is pulled out of the firing unit body 11, the retractor will compress the coil spring and separate from the firing pin, which will then be driven against the cartridge by the expanding coil spring. A suitable connection between the pin and retractor is a laterally opening notch in the lower end of the pin that receives a registering projection 18 on the upper end of the retractor shaft. The engaging lower walls of the notch and shaft projection are inclined, so that as soon as the retractor leaves the firing pin passage the inclined wall of its projection will slide downwardly and laterally on the inclined wall of the notch to separate the retractor from the firing pin and thereby release the pin.

Spaced any desired distance behind, i.e. below, the cable holder is a cylinder 20 that has a closed lower end. Slidably mounted in this cylinder is a piston 21 encircled by a packing ring 22 so that water and air or gas cannot pass it. The piston normally is held in a position, spaced from both ends of the cylinder, by means of one or more shear pins 23 mounted in the side wall of the cylinder and projecting into a groove in the piston. Between the piston and the upper end of the cylinder the side wall of the cylinder is provided with one or more large openings 24 so that the space between the piston and the upper end of the cylinder will always be full of water when the cutter is in use. This cylinder and piston form a hydrodynamic sensor.

Extending through an opening in the top of the cylinder is a tension member 26, such as a line or cable, one end of which is fastened to the piston and the other end of which is fastened to the firing pin retractor. The cable extends through a tube 27 secured at its lower end to the top of the cylinder and at its upper end to the lower end of a bracket 28 provided with a hole through it for the cable. The upper end of the bracket is attached to the side of cutter frame 1. The tube suspends the cylinder from the bracket in a body of water. If a shock wave of predetermined extreme intensity such, for example, as 2000 psi, is produced in the water due to an underwater explosion, the increased water pressure in the cylinder above the piston will cause the piston to shear off pins 23 and move downwardly in the cylinder as indicated in dotted lines in FIG. 2, compressing the air beneath it. This will cause the cable to pull the firing pin retractor and firing pin down until they separate, whereupon the firing pin will spring forward and detonate the cartridge so that the cable will be cut by the chisel. This cable cutter also can be actuated by lowering it into water to a predetermined depth where the water pressure is great enough to cause piston 21 to shear off pins 23 and move down in the cylinder.

Before the cable cutter is put in operating position, accidental retraction of the firing pin is prevented by a safety pin 29, shown in dotted lines in FIG. 2, that extends transversely through the retractor and a hole through the bracket. This pin must be removed before the cable cutter can be actuated. As an additional safety feature, a guard can be placed over the cable between bracket 28 and cylinder 20 to prevent the cable from being kinked by a foreign object striking it accidentally, which couldpull the retractor out of the firing unit body.

Due to the fact that as piston 21 is driven downwardly in the cylinder it will compress the air beneath it, as soon as the shock wave that moved the piston is dissipated the compressed air will expand and drive the piston upwardly until it strikes a stop 30 secured to the inside of the cylinder. As the piston rebounds in this manner, it will move the firing pin retractor 17 upwardly with it, but since the retractor will not be aligned with the firing pin passage in firing unit body 11, the upper end of the retractor will strike the lower end of that body. This will cause loops to be formed in the cable as shown in dotted lines in FIG. 2. If tension member 26 is relatively stiff, it will be damaged by repeated bending in this manner. To avoid this, tension means such as shown in the modification illustrated in FIGS. 3 and 4 can be used.

In these last two figures a bracket 32 extends below the cable holder 33 in the same way as in FIG. 2. The upper end of a tube 34 is secured to the lower end of this bracket, but the lower end of the tube is secured to the upper end of a bracket 35 attached to the sensor cylinder 36. The lower end of the tube is spaced several inches from the cylinder. Extending through the tube is a line, such as a cable or heavy wire 37, the upper end of which is attached to the bottom of a firing pin retractor shaft 38. The lower end of this wire terminates some distance above the cylinder, but it is connected by a flexible chain 39 or the like to the upper end of another cable or wire 40 that extends down through the top of the cylinder and has its lower end secured to the piston 41.

Figure 3:
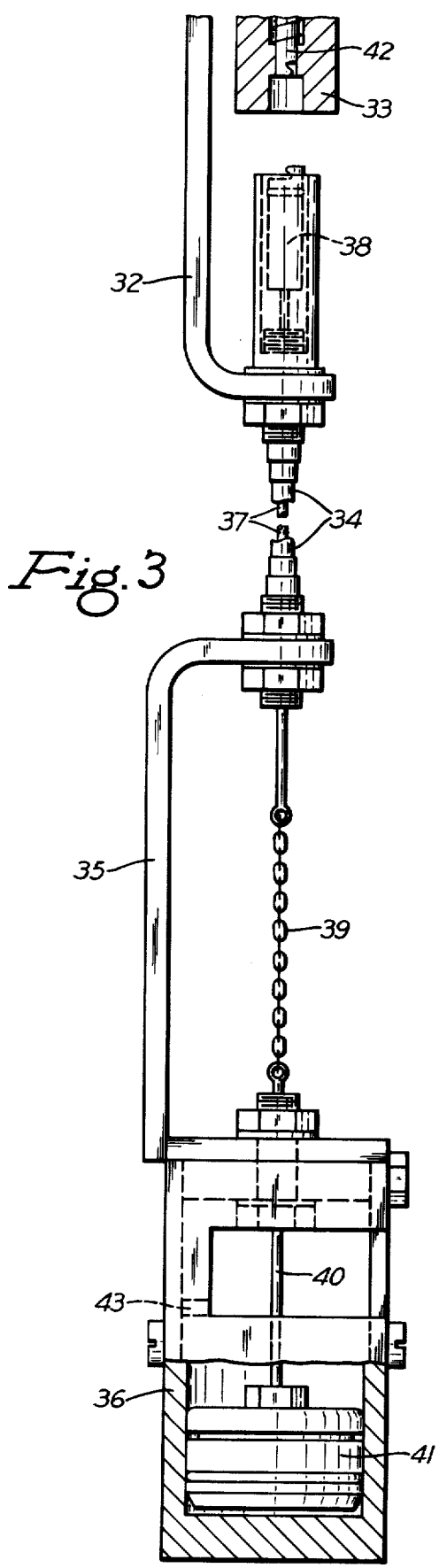
FIG. 3 is a fragmentry view, similar to FIG. 2, of a modification but with the actuating piston in its lower position.
Figure 4:
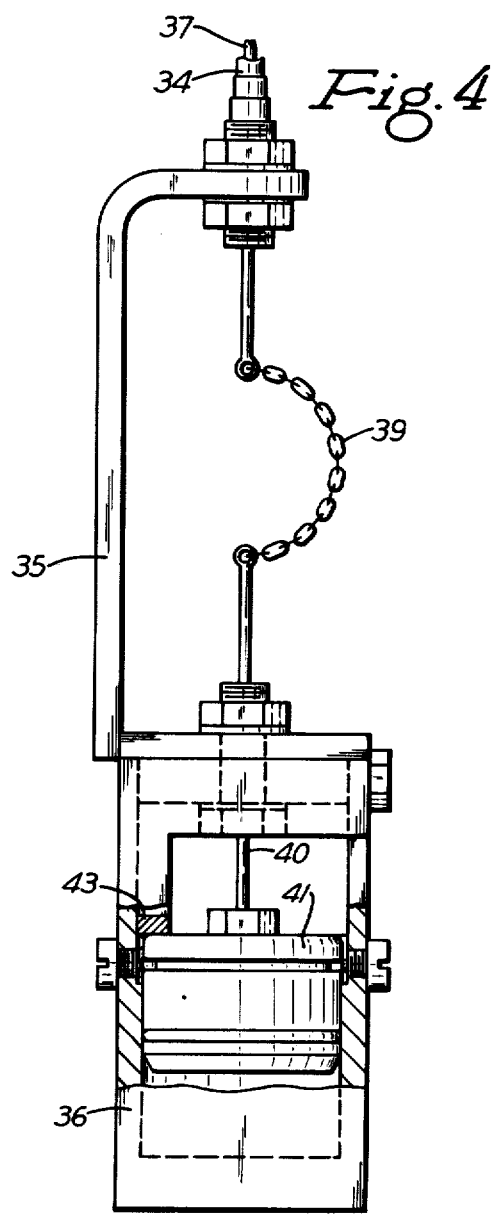
FIG. 4 is a fragmentary view of the modification with the piston moved back up to its upper position after firing of the cutter.

When a shock wave or equivalent pressure in the water surrounding the cylinder drives the piston downwardly as shown in FIG. 3, the entire tension means, consisting of the upper and lower wires and the connecting chain are pulled downwardly to retract the firing pin retractor so that the firing pin 42 will be released. A moment after that happens the compressed air beneath the piston expands and drives the piston up against the stop 43 as shown in FIG. 4. However, this rebound of the piston has no effect on the retractor shaft and wire 37 because the chain will flex and not transmit the upward movement of wire 40 to wire 37. Consequently, no damage will occur to the lines attached to the opposite ends of the chain, no matter how many times the cable cutter is actuated. Although the chain is shown near the hydrodynamic sensor, its location is not limited to that position.

The cable cutter disclosed herein is a rigid structure that can take a considerble amount of abuse without impairing its operation. It requires no electrical elements. Its operation is purely mechanical in response to a predetermined increase in water pressure.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim

1. A hydraulically actuated cable cutter, comprising a cable holder, a cable cutting member in the holder adapted to be driven forward to cut a cable, an explosive charge for driving said member forward, a firing pin slidably mounted in said holder behind the charge for detonating it, a spring urging the pin forward toward the charge, a firing pin retractor slidably mounted in said holder behind said pin and detachably connected with the pin for retracting it a predetermined distance to compress said spring, the connection between the retractor and firing pin being such that when the pin has been retracted said predetermined distance the retractor will release the pin, a cylinder separate from the cable holder spaced behind said retractor and having a front end and a closed rear end, a piston in the cylinder normally spaced from its opposite ends, tension means extending through an opening in the front end of the cylinder and connecting said retractor with the piston, the cylinder being intended for submersion in a body of water and having an opening for the water between its front end and the piston, whereby a predetermined increase in water pressure at the cylinder will move the piston rearwardly therein to retract said retractor until the firing pin is released.

2. A cable cutter according to claim 1, including means for suspending said cylinder a predetermined distance below the cable holder.

3. A cable cutter according to claim 2, in which said suspending means include a tube through which said tension means extends, means connecting one end of the tube with said cylinder. and means connecting the opposite end of the tube with said cable holder.

4. A cable cutter according to claim 3, in which said tension means includes a line extending through said tube, and a length of chain connected to said line outside of the tube.

5. A cable cutter according to claim 1, in which said tension means is a cable.

6. A cable cutter according to claim 1, in which said tension means includes a relatively stiff line and a flexible chain connected end to end.

7. A cable cutter according to claim 1, including a shear pin holding said piston in its normal position until water pressure against it becomes great enough to shear off the pin.

8. A cable cutter according to claim 1, in which air is compressed in the cylinder by the rearwardly-moving piston, and said tension means is flexible enough to buckle when said retractor strikes the cable holder as said piston is moved forward in the cylinder by the expanding compressed air behind it.

9. A cable cutter according to claim 1, in which the rear end of said firing pin is provided with a laterally opening notch, and said retractor is provided with a projection extending into said notch, said projection leaving said notch when they are pulled out of the cable holder.

10. A cable cutter according to claim 1, including spaced brackets extending toward each other from said cable holder and cylinder to which they are secured, the adjacent ends of the brackets extending laterally and provided with openings therethrough, said tension means extending through the bracket openings, a tube encircling the tension means between the brackets, and means connecting the ends of the tube with the brackets to suspend said cylinder from the cable holder, said tension means including a line extending through the tube and a flexible chain connected to one end of the line.

* * * * *